July 1, 1969  F. LOTHMANN  3,452,442

TOOL

Filed Dec. 15, 1966

INVENTOR
Franz Lothmann

BY Spencer & Kaye
ATTORNEYS

United States Patent Office 3,452,442
Patented July 1, 1969

3,452,442
TOOL
Franz Lothmann, Stutgerloch, near Langerwehe, Rhineland, Germany, assignor to O. Dorries Gesellschaft mit beschrankter Haftung, Duren, Germany
Filed Dec. 15, 1966, Ser. No. 601,911
Claims priority, application Germany, Mar. 20, 1965,
D 46,859
Int. Cl. B27g 23/00
U.S. Cl. 33—185          4 Claims

ABSTRACT OF THE DISCLOSURE

An adjusting device for presetting the proper position of a tool. The device has gauging means which include a bar having at its lower end a gauge element, the bar being mounted on a cross slide of the machine and being vertically moveable with respect thereto. In one predetermined end position of the bar the gauge element is disposed next to a tool received by the tool holder of the machine. The bar is rotatable about its longitudinal axis so that the gauge element is pivotable with respect to the tool received by the tool holder. Consequently, the tool is aligned with the gauge element to assure the proper setting for the tool.

---

The present invention relates to a tool adjusting device for machining tools which are used in machining devices such as lathes, and preferably to a tool adjusting device for the presetting of such tools.

The use of large and bulky tool holders often creates inexact control conditions for machining tools which are positioned by a slide carriage. Generally, machining devices are provided with means for supervising the cutting edge of the tools and below which means, a sufficiently large free space must be available, which space corresponds to the entire adjustment range for the tool. Accordingly, the longitudinal carriage for the tool is necessarily in the form of a cantilever or a bridge, with the slide rails being arranged at a great distance from the measuring point. Due to the rails being positioned at a substantial distance from the measuring point, there generally results unstable and inexact control conditions which influence the fineness of the adjustment in a disadvantageous manner.

It is therefore an object of the present invention to provide a novel tool adjusting device for machining tools.

According to the present invention, the afore-described disadvantages and drawbacks are eliminated, together with other disadvantages, by providing a tool adjusting device for machining tools and preferably for the pre-setting of such tools. Thus, a carriage for carrying a spindle or the like which in turn carries a tool holder is provided at the machine bed and is mounted so as to be manually or automatically displaceable along longitudinal rails which are separate and independent from a cross slide. A frame or other arrangement is provided at the edge of the machine bed for guiding a cross slide which is mounted thereon and which may be displaced in a conventional manner either manually or by a motor drive. The cross slide may be provided with optical means or other suitable means for supervising and adjusting the setting of the cutting tool carried by the tool holder.

According to the present invention, the cross slide is further provided with a bar-like element which is vertically slidable therein and also rotatable about its longitudinal axis. The bar-like element is provided with a gauge element at the lower end thereof which serves as a standard for the alignment of the cutting tool when the bar-like element is in its lowermost position within the cross slide. Advantageously, clamping means are provided for maintaining the bar-like element and its gauge element in the required or desired position. Furthermore, the tool holder with the longitudinally moveable carriage can be brought into the region which is supervised by the optical means of the cross slide or by other means which are independent of the cross slide. Subsequently, the tool is inserted into the opening of the tool holder which is adapted to receive such tool and by means of scanning or sight comparison the tool may be aligned with the control plate of the bar-like element for the proper setting of the tool.

Additional objects and advantages of the present invention will become apparent upon consideration of the following description when taken in conjunction with the accompanying drawings in which.

Figure 1:
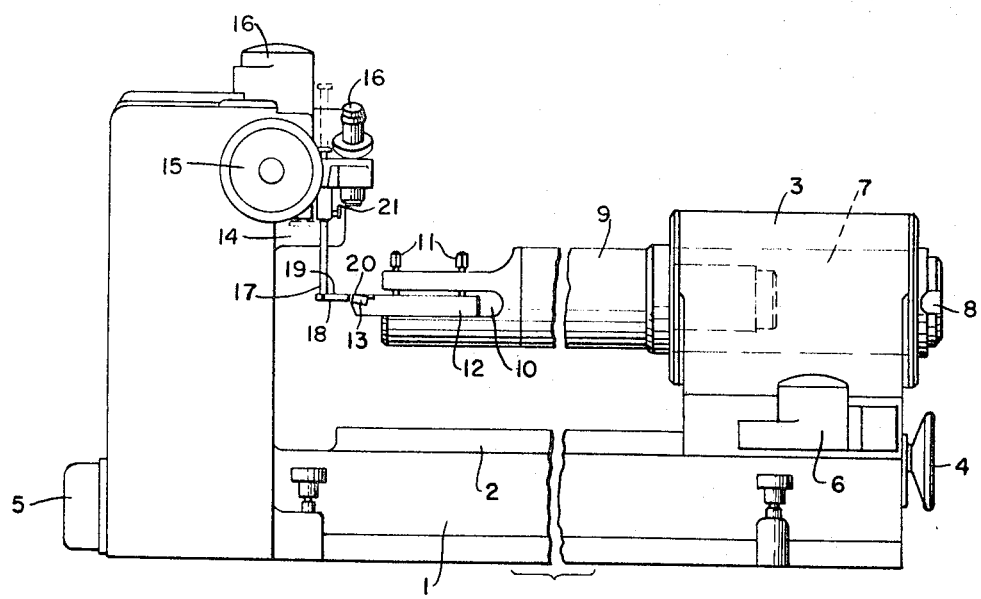
FIGURE 1 is a lateral view of a machine bed provided with a longitudinal slide carriage and with a cross slide according to the present invention.
Figure 2:
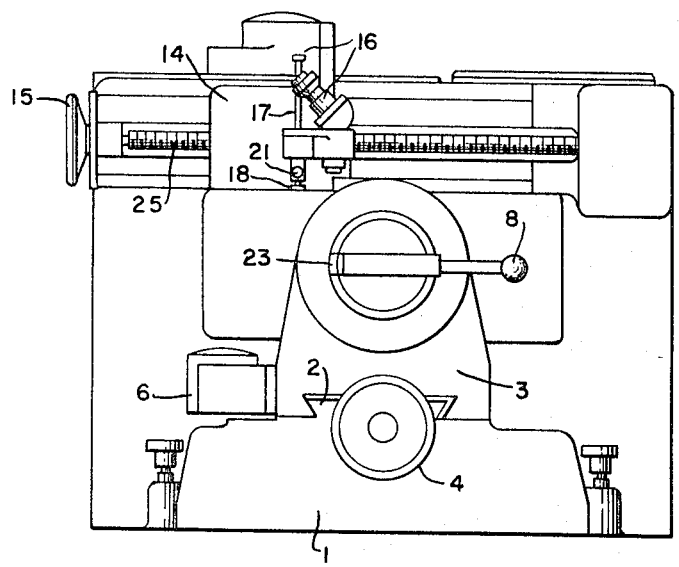
FIGURE 2 is a front view of the cross slide according to the present invention.

Referring now to the drawings, there is shown in FIGURE 1 a machine bed 1 having a longitudinal carriage 3 provided thereon which is slidable and adjustable along the longitudinal rails 2 by a hand wheel 4 or a motor 5 via a coupling means not shown. For the supervision and adjustment of the longitudinal movements of the carriage 3, there is provided a conventional measuring device 6 adjacent thereto. The longitudinal carriage is adapted to receive a spindle sleeve 7 which is rotatable about the longitudinal axis thereof by means of a lever 8. As shown in FIGURE 2, two slots 23 are provided at one end of the carriage 3 and are offset with respect to each other by 180°. The slots are adapted for receiving the lever 8 for stopping the rotation of the spindle sleeve 7. A tool holder 9 is provided at the free end of the spindle sleeve and is carried thereby and may be held within the spindle sleeve in any suitable manner, such as by being inserted in a bore contained within the spindle sleeve 7. The projecting end of the tool holder is provided with an opening 10 for the insertion of a tool 12 having a cutting edge 13, the tool being mounted within the opening by means of screws 11 or other suitable mounting means.

There is also provided on the machine bed, according to the present invention, at the end of the longitudinal rail 2 a cross slide 14 arranged for longitudinal movement transverse to the longitudinal rail 2. The cross slide 14 can be adjusted by means of a hand wheel 15 or any other suitable means for movement along the longitudinal shaft 25 shown in FIGURE 2. The adjustment of the cross slide may be supervised through optical means 16 or any other suitable means mounted thereon. The cross slide 14 is furthermore provided with a bar-like element 17 which is mounted thereon for vertical movement with respect thereto and which is rotatable about its longitudinal axis. The bar-like element 17 is provided at its lower end with a gauge element in the form of a control plate 18 extending transversely to the longitudinal axis of the element 17 and which may be pivoted by rotation of the bar-like element. The control plate is arranged in such a manner that the surface 19 of the control plate 18, when the bar-like element is in its lowermost position, lies in a horizontal plane corresponding to the height of the desired working position for the tool, for example, the middle axis of the tool holder.

For setting the tool 12, the cross slide 14 is moved into the proper position and the bar-like element 17 is placed in its lowermost position. The element 17 is then rotated about its longitudinal axis until the control plate 18 rests against the surface of the tool 12 which is to be adjusted. By the use of the optical means 16 or any other suitable means a scanning comparison or the like is performed so as to position the tool 12 so that its surface 20 is provided at the same height as the surface 19 of the control plate 18 and aligned therewith. With the tool 12 then being secured in this position by screws 11 or any other securing means provided for this purpose. Subsequent to the setting of the tool 12, the bar-like element 17 is raised and may be rotated about its longitudinal axis, as shown in dashed line in FIGURE 1 and in solid line in FIGURE 2, in order to remove the element from the working area and then securing the element in the upper position by a clamping screw 21 or by any other suitable means.

Thus, it has been shown that through use of the cross slide of the present invention with the bar-like element having a control plate arranged thereon, a machining tool may be pre-set to the desired position with a continuing exactness which has heretofore been unobtainable and which exactness is required for fine machining purposes.

It will be understood that the above description of the present invention is susceptible to various modifications, changes and adaptations.

What is claimed is:

1. An adjusting device for positioning a tool comprising in combination
   (a) a machine bed having longitudinal guide rails thereon;
   (b) a carriage mounted for movement on said rails and carrying a spindle sleeve which is rotatable about its longitudinal axis;
   (c) a tool holder carried by said spindle sleeve and having an opening therein for adjustably receiving a tool having a cutting edge;
   (d) a cross slide mounted on said machine bed for movement in a direction transverse to the longitudinal direction of said longitudinal guide rails, said cross slide being moveable to a position adjacent said tool holder; and
   (e) bar means having a gauge element at the lower end thereof and mounted on said cross slide, said bar means being vertically moveable with respect to said cross slide and having a predetermined end position in which said gauge element is disposed adjacent to the tool received by said tool holder; said bar means being rotatable about its longitudinal axis so that said gauge element is pivotable with respect to the tool received by said tool holder, whereby the tool is aligned with said gauge element to assure the proper setting for the tool.

2. The combination defined in claim 1 wherein said gauge element is a control plate and the tool is aligned therewith.

3. The combination defined in claim 1 wherein said predetermined end position for said bar means serves as a standard for determining the setting of the tool received by said tool holder, and clamping means are provided on said cross slide for maintaining said bar means in any desired position.

4. The combination defined in claim 2 and further including means provided on said cross slide for comparing the position of the tool received by said tool holder with respect to the position of said control plate when said bar means is in its predetermined end position.

References Cited

UNITED STATES PATENTS

| | | | |
|---|---|---|---|
| 2,006,854 | 7/1935 | Winter | 33—185 |
| 2,493,332 | 1/1950 | Aubin | 33—185 X |
| 2,657,470 | 11/1953 | Allen et al. | 33—185 |
| 3,252,202 | 5/1966 | Bullard et al. | 33—185 X |

WILLIAM D. MARTIN, JR., *Primary Examiner.*

U.S. Cl. X.R.

33—169, 201